United States Patent

Hoium et al.

[11] Patent Number: 6,095,427
[45] Date of Patent: Aug. 1, 2000

[54] TEMPERATURE CONTROL SYSTEM AND METHOD FOR EFFICIENTLY OBTAINING AND MAINTAINING THE TEMPERATURE IN A CONDITIONED SPACE

[75] Inventors: Stanley O. Hoium, West St. Paul; Peter W. Freund, Bloomington, both of Minn.

[73] Assignee: Thermo King Corporation, Minneapolis, Minn.

[21] Appl. No.: 09/296,569

[22] Filed: Apr. 22, 1999

Related U.S. Application Data

[60] Provisional application No. 60/113,613, Dec. 23, 1998.

[51] Int. Cl.$^7$ ........................................ F24F 7/00
[52] U.S. Cl. ............................ 236/49.3; 62/157; 62/229; 236/46 F
[58] Field of Search ................. 236/49.3, 46 F, 236/46 R; 62/229, 157, 231; 340/588, 589

[56] References Cited

U.S. PATENT DOCUMENTS

| | | |
|---|---|---|
| 4,178,769 | 12/1979 | Johnsen . |
| 4,335,582 | 6/1982 | Shaw et al. . |
| 4,365,983 | 12/1982 | Abraham et al. . |
| 4,419,866 | 12/1983 | Howland . |
| 4,570,448 | 2/1986 | Smith .............................. 62/89 |
| 4,656,835 | 4/1987 | Kidder et al. .................. 62/175 |
| 4,658,593 | 4/1987 | Stenvinkel . |
| 4,663,725 | 5/1987 | Truckenbrod et al. . |
| 4,819,441 | 4/1989 | Hanson . |
| 4,841,738 | 6/1989 | Katsuki et al. ................ 62/160 |
| 4,899,549 | 2/1990 | Berge et al. . |
| 4,903,498 | 2/1990 | Hanson . |
| 4,903,502 | 2/1990 | Hanson et al. ................ 62/228.5 |
| 4,918,932 | 4/1990 | Gustafson et al. .............. 62/89 |
| 5,107,686 | 4/1992 | Howland . |
| 5,123,252 | 6/1992 | Hanson . |
| 5,157,933 | 10/1992 | Brendel . |
| 5,228,301 | 7/1993 | Sjoholm et al. . |
| 5,295,364 | 3/1994 | Truckenbrod et al. ......... 62/209 |
| 5,400,609 | 3/1995 | Sjoholm et al. . |
| 5,415,346 | 5/1995 | Bishop ............................ 236/78 D |
| 5,440,891 | 8/1995 | Hindmon, Jr. et al. ......... 62/117 |
| 5,475,986 | 12/1995 | Bahel et al. . |
| 5,557,938 | 9/1996 | Hanson et al. . |
| 5,634,347 | 6/1997 | Hanson et al. ................ 62/120 |
| 5,669,223 | 9/1997 | Haley et al. . |
| 5,669,225 | 9/1997 | Beaverson et al. . |
| 5,743,097 | 4/1998 | Frank . |

*Primary Examiner*—William Doerrler
*Assistant Examiner*—Marc Norman
*Attorney, Agent, or Firm*—Michael M. Gnibus

[57] ABSTRACT

A method for efficiently maintaining the temperature of fluid in a conditioned space at a predetermined set point temperature, the method comprising the steps of: (a) operating the temperature control system in a first operating mode; (b) sensing the temperature of the conditioned space fluid; (c) calculating the Integral Error of the temperature of the conditioned space fluid; and (d) if the Integral Error equals or exceeds a predetermined Integral Error threshold value for the first operating mode, switching the unit to a second operating mode.

8 Claims, 6 Drawing Sheets

MODE DIAGRAM FOR FRESH LOAD

TEMPERATURE CONTROL SYSTEM AND METHOD FOR EFFICIENTLY OBTAINING AND MAINTAINING THE TEMPERATURE IN A CONDITIONED SPACE

This application claims the benefit of U.S. Provisional Application No. 60/113,613, filed Dec. 23, 1998.

BACKGROUND OF THE INVENTION

The invention relates to a system and method for maintaining a set point temperature in a transport temperature control system; and more particularly the invention relates to a temperature control system and method for efficiently obtaining and maintaining a predetermined set point temperature in a conditioned space by monitoring the difference between the set point and conditioned space temperatures, and also monitoring the time rate of change of the temperature of the conditioned space return air.

Mobile temperature control systems maintain air in a conditioned space at a predetermined set point temperature required to keep the goods in the conditioned space suitable for delivery to an end user or customer. The conditioned space may be a container, truck or tractor trailer that is transported to one or more delivery locations.

During shipment of the goods, the temperature of the air in the conditioned space typically fluctuates due to changing ambient conditions, opening and closing the doors to the conditioned space during deliveries, and the type of goods in the conditioned space. As a result, in order to maintain the conditioned space temperature at the predetermined acceptable set point temperature, it is usually necessary to frequently switch the unit between cooling and heating modes. For example, if the air temperature in the conditioned space falls below the desired set point temperature, the temperature control system will switch from a cooling mode, where the system delivers air to the conditioned space at a temperature that may be ten degrees below the temperature of the conditioned space air, to a heating mode, where the system delivers air to the conditioned space at a temperature that may be ten degrees warmer than the temperature of the air in the conditioned space. Conversely, if the actual conditioned space air temperature is above the predetermined set point temperature, the temperature control system will switch from the heating mode to the cooling mode.

Switching between the temperature control unit heating and cooling modes to obtain the set point temperature in the conditioned space often causes the set point temperature to be overshot. After the heating mode is terminated, the resultant conditioned space air temperature usually overshoots the set point temperature and settles at a temperature above set point; and conversely, after the cooling mode is terminated, the resultant conditioned space air temperature usually overshoots the set point temperature and settles at a temperature that is below the desired set point temperature. Such deviations from the set point temperature can negatively affect the quality of the goods in the conditioned space.

Conventional temperature control units are driven by a prime mover that operates between a low speed of 1450 rpm and a high speed of 2200 rpm. Typical temperature control units operate in low speed cooling mode, low speed heating mode, high speed cooling mode and high speed heating mode. The required operating mode is dependant on the magnitude of the difference between the set point and actual temperature of the conditioned space air, and also whether the actual conditioned space temperature is below or above the set point temperature. The units are operated in the mode required to return the conditioned space to the set point temperature and the unit typically operates in the prescribed mode until the temperature returns to the set point temperature. In most instances temperature control units effectively maintain the conditioned space set point temperature however in some instances it is possible for the temperature in the conditioned space to hang at a temperature outside of the set point temperature for a period of time. In systems that experience hanging, the mode of operation of the unit is typically determined simply by calculating the difference between the set point temperature and the temperature of the air in the conditioned space and selecting the mode of operation that corresponds to the temperature difference. This is an inefficient method for maintaining set point temperature in the conditioned space and decreases the fuel efficiency of the unit.

In order to overcome the problem of hanging in conventional temperature control units, temperature control units now may include timers that are programmed to run the unit at either high or low speed cooling or heating modes for a period of time and when the timer times out, if the conditioned space air has not returned to the desired set point temperature, the controller then switches to the next higher mode, such as high speed cooling or heating mode. However, automatically switching the unit from one operating speed to another when a timer times out is also an inefficient method of operating the temperature control system. The timers do not take into account the rate of change of the conditioned space air and also do not take into account the proximity of the temperature of the conditioned space air relative to the set point temperature when the timer times out. The unit may be switched to high speed when the set point could have been reached if the unit remained at the low speed for an additional period of time. Additional fuel is expended switching the unit operating modes.

The foregoing illustrates limitations known to exist in present devices and methods. Thus, it is apparent that it would be advantageous to provide an alternative directed to efficiently obtaining and maintaining the set point temperature. Accordingly, a suitable alternative is provided including features more fully disclosed hereinafter.

SUMMARY OF THE INVENTION

The invention is a method for efficiently obtaining and maintaining the desired conditioned space set point temperature. The method eliminates hanging and overshooting set point problems common to current temperature control units and methods.

In one aspect of the invention, this is accomplished by providing a method that includes the steps of sensing the return air temperature, comparing the sensed return air temperature to the set point temperature and if the return air temperature is not equal to the set point temperature, calculating a new Integral Error value and adding the new Integral Error value to the previously summed Integral Error value. If the temperature of the return air or the summed Integral Error value is equal to or greater than a predetermined maximum for a given operating mode, the unit is switched to the next higher operating mode.

As the return air temperature approaches the conditioned space set point, if the temperature rate of change is at a predetermined value and the return air temperature is proximate the set point temperature, the unit is switched to a low speed heat unloaded operating mode. By monitoring the time rate of change and proximity of the return air temperature to the set point, the problem of overshooting the set point is eliminated.

The Integral Error is calculated by the following formula $(T_{ra}-T_{ac}) \cdot$(Time Interval Since Last Calculation). In this way, the method of the present invention monitors changes in the return air temperature during a given time period. By changing the unit operating mode if the Integral Error value exceeds a predetermined maximum, the method of the present invention eliminates the hanging problem associated with typical temperature control units.

The foregoing and other aspects will become apparent from the following detailed description of the invention when considered in conjunction with the accompanying drawing figures.

DESCRIPTION OF THE DRAWING FIGURES.

Figure 3A:
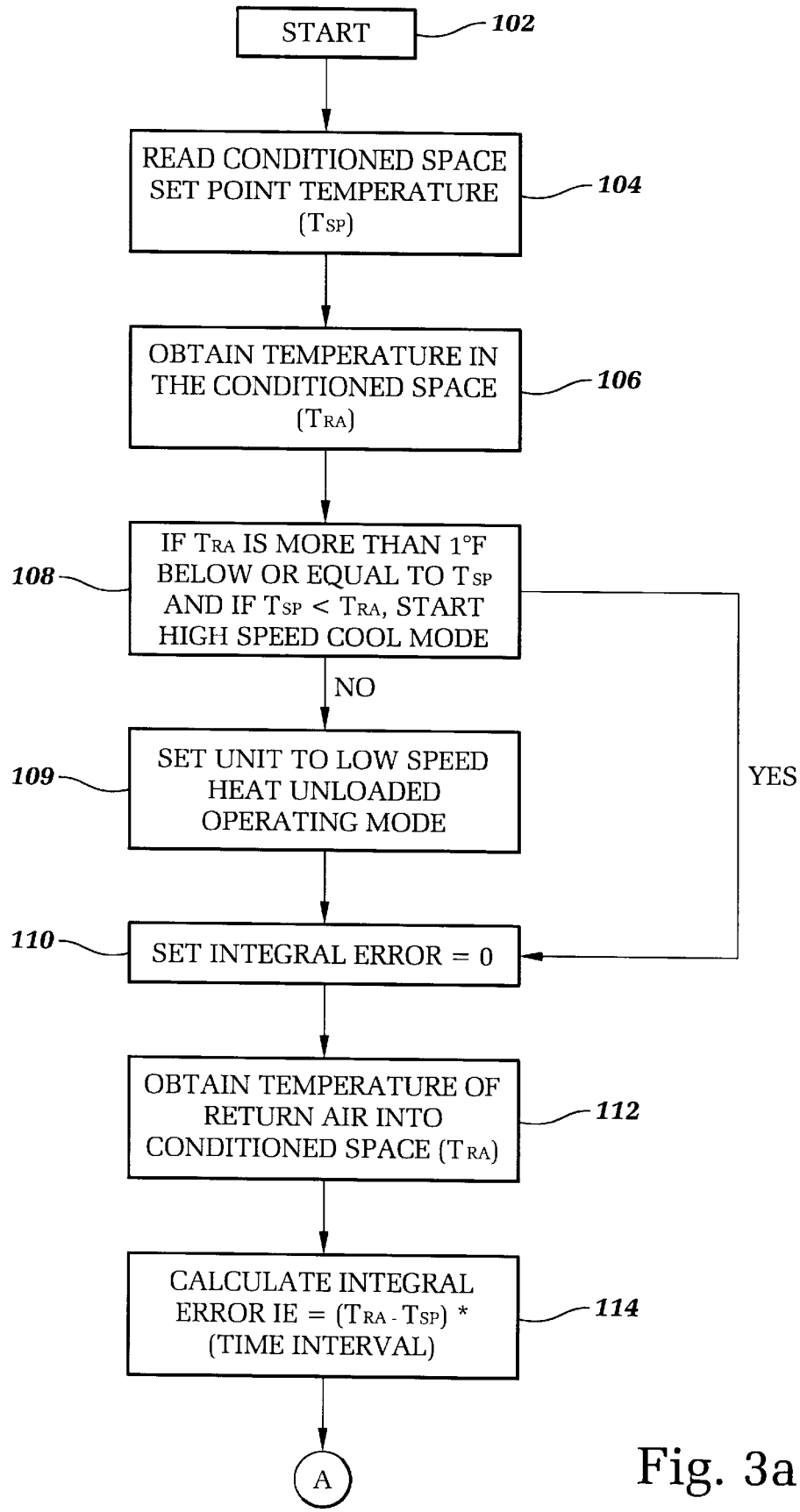
Figure 3B:
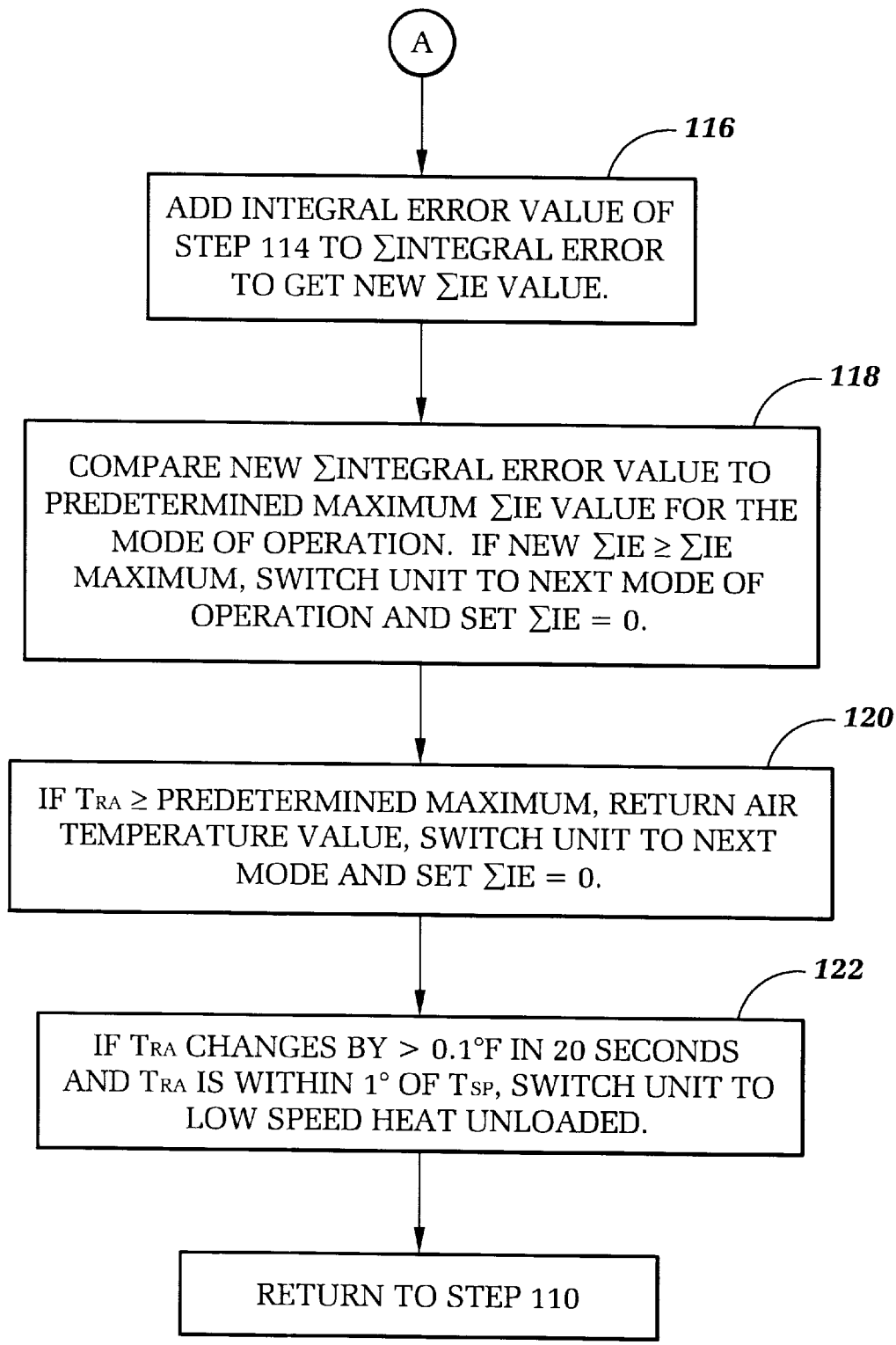
Figure 4:
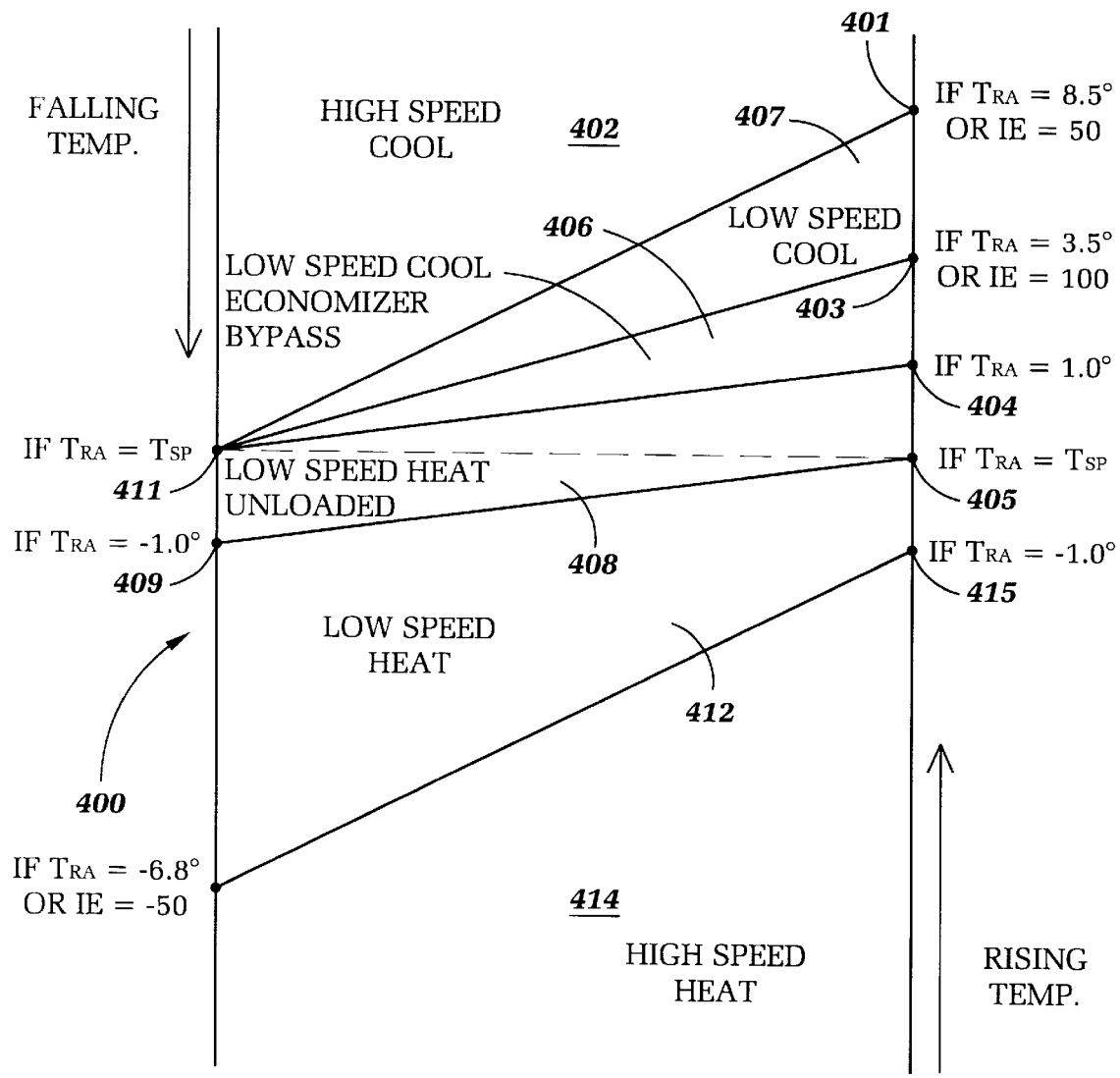
Figure 5:
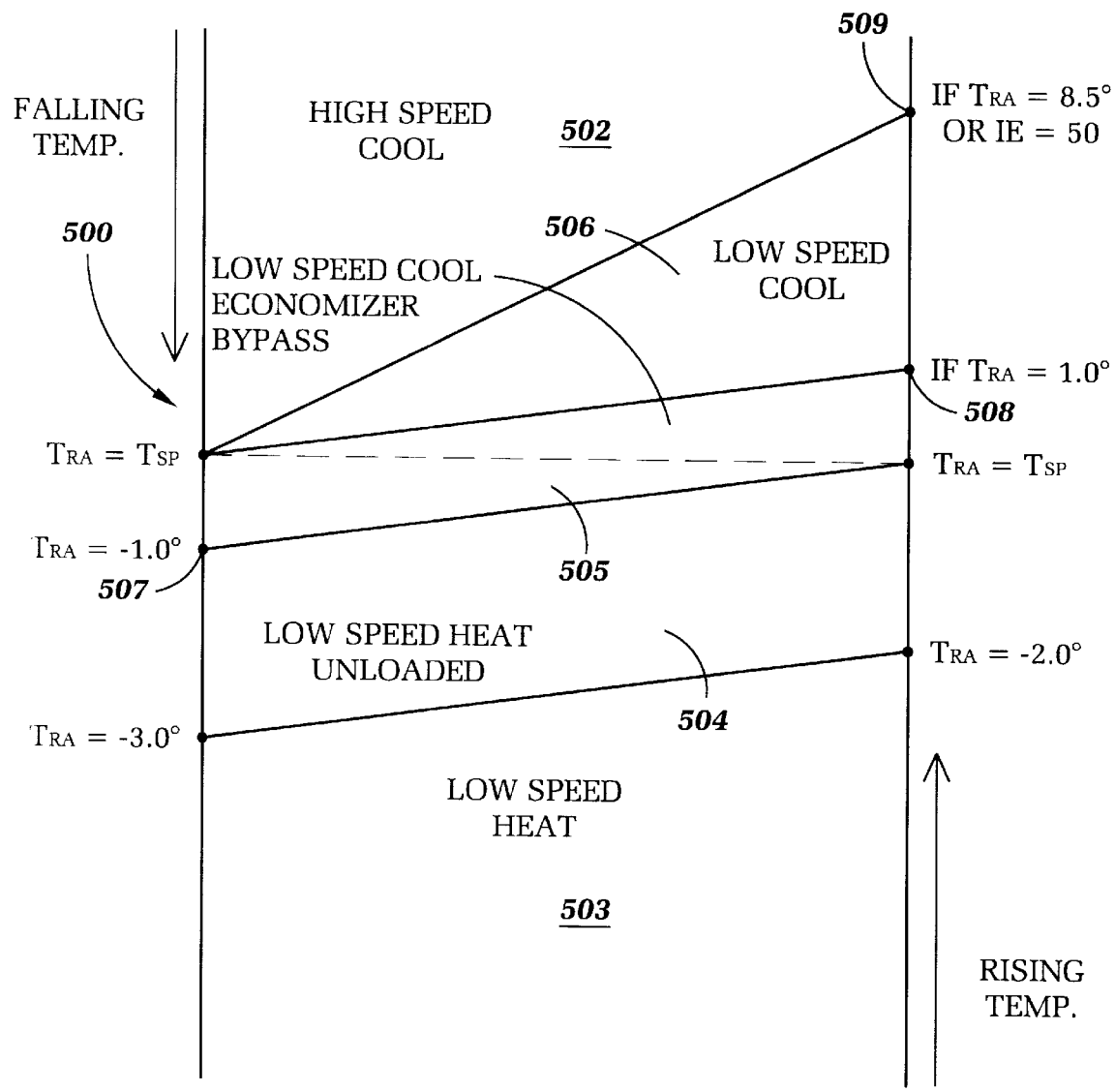

FIGS. 3a and 3b taken together are a flow chart representation of the present invention method for efficiently obtaining and maintaining the desired temperature in a conditioned space;

FIG. 4 is a fresh load operating mode algorithm graphically represented in the form of a look up table; and FIG. 5 is a frozen load operating mode algorithm graphically represented in the form of a look up table.

DESCRIPTION OF THE PREFERRED EMBODIMENT

Figure 1:
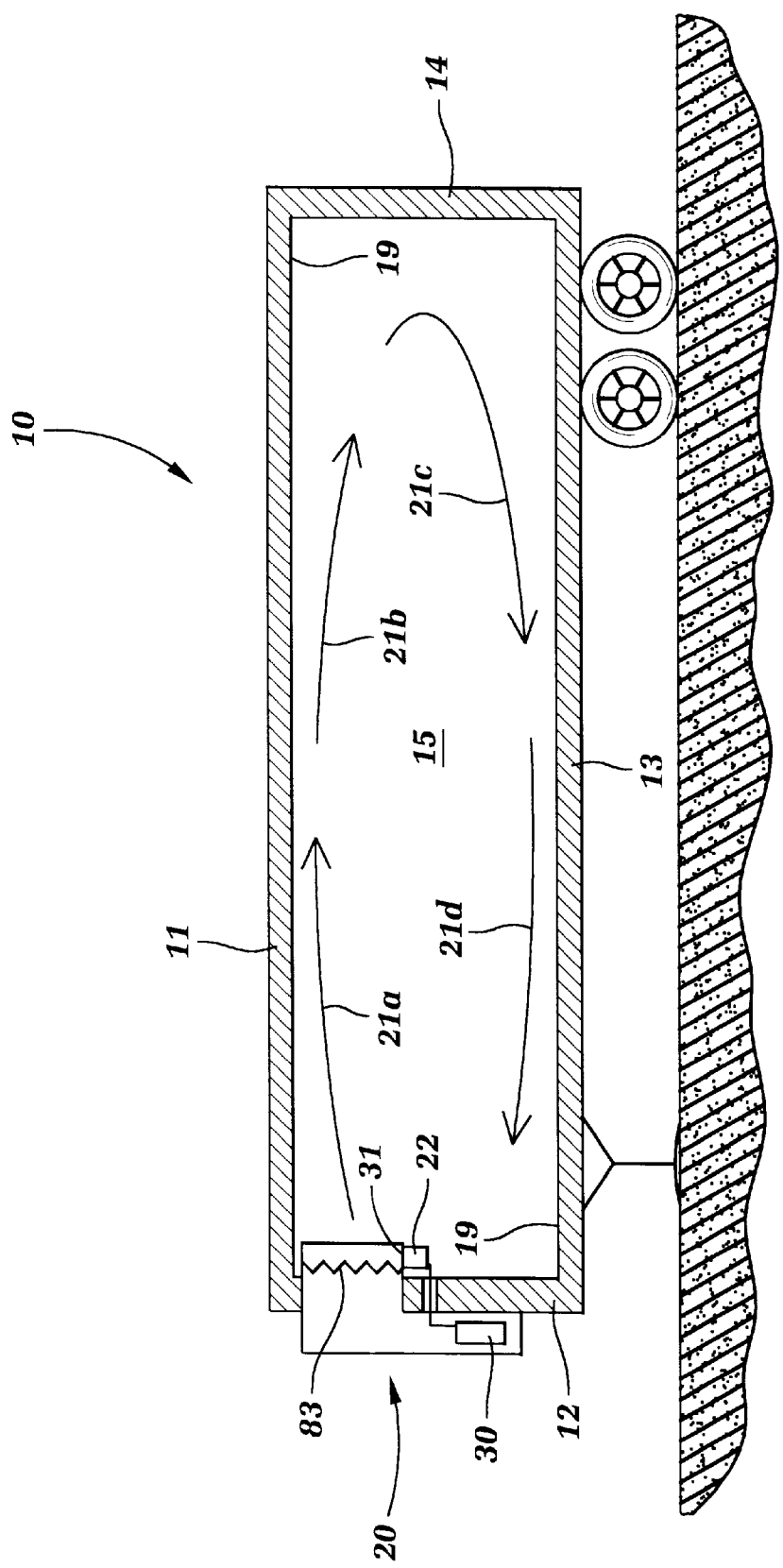
FIG. 1 is a longitudinal sectional view of a trailer with a temperature control unit mounted on the front of the trailer.

Turning now to the drawings wherein like parts are referred to by the same number throughout the several views, FIG. 1 illustrates a conventional trailer 10 that includes conditioned space 19 defined by top and bottom panels 11 and 13, front and rear panels 12 and 14, and a pair of longitudinal side panels 15 (only one is shown) joining the other panels. Although conditioned space 19 is described as being defined by a trailer 10, it should be understood that the conditioned space could be defined by a truck, container, bus, railway car or other enclosed volume or space requiring temperature in the enclosed conditioned space to be maintained at a predetermined set point temperature.

As shown in FIG. 1, temperature control unit 20 is mounted on the front trailer panel in a conventional manner in order to direct air through the conditioned space 19 generally in the direction represented by arrows 21a–d. Unit 20 has a number of different modes of operation including High Speed Cool (HSC), Low Speed Cool (LSC), Low Speed Cool Economizer Bypass (LSCEB), Low Speed Heat Unloaded (LSHUL), Low Speed Heat (LSH), and high Speed Heat (HSH). When the unit is used to maintain the temperature of a fresh load, the unit 20 may utilize all of the modes of operation to achieve the desired set point. See FIG. 4. When the unit is used to maintain the temperature of a frozen load, the unit operates in all the foregoing modes except for High Speed Heat. For purposes of this disclosure, a frozen load is any load with an associated required conditioned space set point temperature that is less than 15° F., and a fresh load is any load having an associated required conditioned space temperature that is greater than 15° F.

A conventional return air temperature sensor 22 is located in conditioned space 19 to regularly monitor the temperature of the return air as it enters unit 20. The temperature sensor is attached to the temperature control unit 20 at the evaporator inlet 31 in the manner shown schematically in FIG. 1. The temperature sensor is connected in signal transmitting relation with the controller 30 and provides the return air temperature to the controller for comparison with a predetermined set point temperature stored in controller memory 32.

Figure 2:
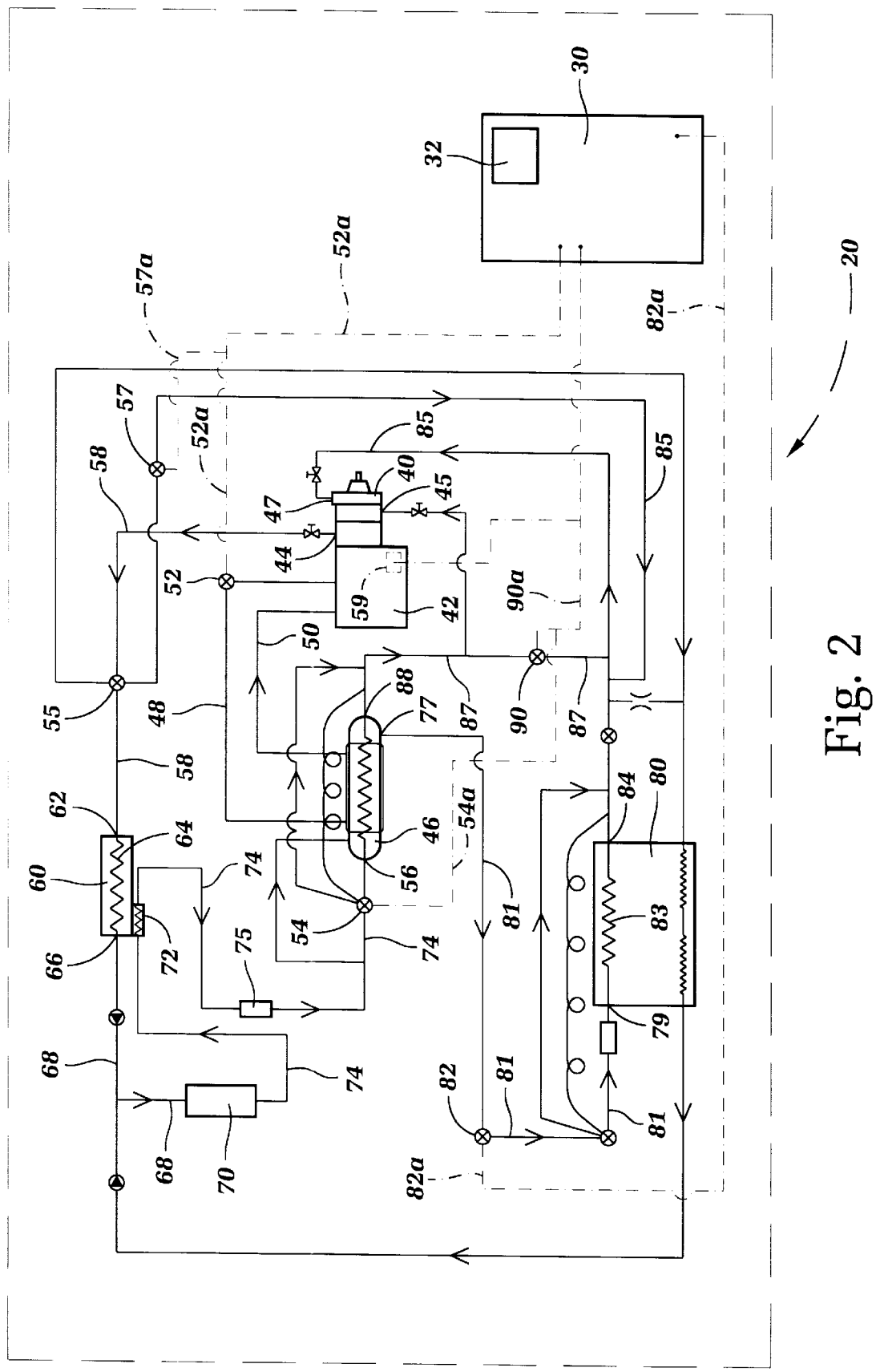
FIG. 2 is a schematic view of the temperature control unit illustrated in FIG. 1.

Turning now to FIG. 2 which schematically illustrates the temperature control unit system 20, the system controller 30 is a microprocessor based controller that includes a memory 32. A logic routine or program 100 is stored in memory 32 and is executed continuously when the unit 20 is operating. The routine is illustrated generally in the flow chart representation in FIGS. 3a and 3b.

The routine 100 generally represents the method of the present invention. Prior to starting the unit 20, the temperature control system operator can enter a desired conditioned space set point temperature into the controller memory 32 using a keypad or other conventional input means (not shown) provided on the controller.

As shown in FIG. 2, the system includes a compressor 40 that is driven by a suitable prime mover 42 which may be a diesel engine for example. Prime mover 42 operates at a high speed of approximately 2200 rpm and a low speed of approximately 1450 rpm. The prime mover includes a run relay 59 that is energized by the controller to start and stop the prime mover and to change the prime mover operating speed.

For purposes of describing the preferred embodiment of the invention, the compressor is a rotary screw compressor having an inlets 45 and 47 through which low pressure fluid such as a refrigerant enters the compression module, a discharge port 44 through which high pressure refrigerant is discharged from the compressor and interengaging male and female rotors (not shown) which compress the refrigerant as it flows between the inlet and discharge ports. It should be understood that the compressor may be any compressor suitable to compress a heat absorbing fluid, and the prime mover may be any means suitable to drive the compressor.

The prime mover is fluidly connected to an economizer/ heat exchanger 46 by discharge and return conduits 48 and 50 respectively. A prime mover discharge conduit water solenoid valve 52 is flow connected to discharge conduit 48 as shown in FIG. 2. The water solenoid valve 52 is opened and closed as required by controller 30 during operation of unit 20 to intermittently supply prime mover heat exchange fluid to the economizer 46. The prime mover discharge conduit solenoid valve 52 is electrically connected to the controller 30 in a conventional manner by communication means 52a, which may be a wire, so that the solenoid valve is in signal receiving relation with the controller.

A pilot solenoid valve 57 is located upstream from three way valve 55, and is opened and closed as required by controller 30 during operation of unit 20 to intermittently supply refrigerant to the compressor 40. The pilot solenoid valve 57 is electrically connected to the controller 30 in a conventional manner by communication means 57a, which may be a wire, so that the solenoid valve is in signal receiving relation with the controller.

The compressor discharge port 44 is flow connected to the system condenser 60 at condenser inlet 62 by conduit 58. Three way valve 55 is flow connected to conduit 58 and serves to regulate the flow of refrigerant to condenser 60. The condenser is a conventional condenser well known to one skilled in the relevant art and serves to condense the high pressure refrigerant as it flows through the condenser coils 64. The condenser discharge port 66 is flow connected to receiver tank 70 by conduit 68. The condenser may include a condenser subcool coil 72 to further cool the refrigerant.

Before continuing downstream, the discharged condensed refrigerant is collected in receiver tank 70. The receiver tank is flow connected to the condenser discharge port by conduit 68 and is flow connected to the economizer inlet 56 by conduit 74. Additionally, conduit 74 may be flow connected to the subcool coil 72 as shown in FIG. 2, and a dehydrator 75.

The primary economizer discharge port 77 is flow connected to the inlet 79 of evaporator 80 by conduit 81. Flow is controlled in conduit 81 by solenoid valve 82. Like solenoid valve 48, the solenoid valve 82 is electrically connected in signal receiving relation with controller 30 so that by sending signals to valve 82, the controller can open and close the valve as required during operation of temperature control unit 20. The valve 82 is electrically connected to the controller by communication means 82a which may be a wire for example.

The evaporator discharge port 84 is flow connected to the compressor inlet 47 by flow conduit 85. Conventional evaporator coils 83 extend between the evaporator inlet 79 and discharge 84. The evaporator 80 is of a design well known to one skilled in the art and further description of the evaporator is not required.

Conduit 87 flow connects the secondary economizer discharge port 88 to compressor economizer suction inlet 45. Conduit 87 also connects to evaporator discharge conduit 85 through solenoid by pass valve 90 located in conduit 87. Like valves 48 and 82 previously described, the solenoid bypass valve 90 is in signal receiving relation with controller 30. The solenoid valve 90 is electrically connected to the controller by communication means 90a. When the solenoid valve is open, the portion of refrigerant that flows from the economizer 46 is directed to compressor inlet 45. When it is necessary to obtain full cooling capacity, the by pass valve 90 is closed and solenoid valve 82 is open thereby causing refrigerant to flow through the evaporator to compressor inlet 47.

Operation of the system 20 related to this invention will now be described.

FIGS. 3a and 3b is a flow chart representation of the method of the present invention and logic 100 that is stored in controller memory 32. FIGS. 3a and 3b taken together represent the method of the invention. The routine is executed continuously and rapidly during operation of temperature control system 20.

The conditioned space set point temperature may be entered into the controller memory by a system operator before the unit is started. When the unit 20 is started, routine 100 is concurrently started in Step 102.

Upon unit startup in Step 104 the controller obtains the conditioned space set point temperature ($T_{sp}$) from memory 32 and in Step 106, the controller obtains the return air temperature ($T_{RA}$) from sensor 22.

In Step 108 the return air temperature is compared to the stored set point temperature. If the value of $T_{RA}$ is more than one degree greater than value $T_{sp}$ the unit is started in High Speed Cool mode. When the unit is in the HSC mode of operation, a signal is sent from the controller to the relay 59 setting the engine to operate high speed. In the HSC modes the unit 20 cools the conditioned space in a conventional manner by supplying compressed refrigerant first to the condenser and then to the evaporator to remove heat from the air in the conditioned space. This mode of operation is well known to one skilled in the art and therefore it is not necessary to described this mode of operation in greater detail.

In Step 109, if the value of the return air temperature is not more than one degree greater or less than the set point temperature, then the unit is started in an operating mode referred to as Low Speed Heat Unloaded, (LSHUL). When the unit is set to the LSHUL mode of operation, the controller sends outputs to the following system components: the engine run relay 59 is set to low speed, the economizer bypass valve 90 is energized, the pilot solenoid valve 57 is deenergized, the water valve 52 is energized, and the liquid line solenoid 82 is energized.

By opening and closing the valves in this manner, refrigerant is not supplied to evaporator coil 83 but is pumped by the compressor 40 through the condenser 60 and the economizer 46, thereby stopping system cooling. Additionally a coolant such as water is supplied from the prime mover 42 to the economizer to serve as a source of heat to the refrigerant flowing through the economizer. In this way, the economizer serves the same function during the heating mode that the evaporator serves during the cooling mode. The position of three way valve 55 remains unchanged thereby causing the compressor discharge gas to be pumped to ambient instead of to the box. The LSHUL setting allows the engine to run to keep the air circulating in the conditioned space 15.

At this time, the air in the conditioned space continues to circulate through the space 19 in the direction shown in FIG. 1 by arrows 21a–21d. The air flows across the evaporator coil 83 but is not cooled by the coils. Fans (not shown) continue to circulate the conditioned space air in this manner. The temperature of the conditioned space air rises gradually ensuring the set point temperature will be obtained without overshooting the desired set point.

If the system is started in High Speed Cool the unit continues to operate in the HSC mode until the temperature of the return air is equal to the set point temperature and then the system switches to LSHUL as previously described.

FIG. 4 is an algorithm for system operation when the load in the conditioned space is a fresh load.

In Step 110 of FIG. 3a, the Integral Error value is set to zero. During system operation, the Integral Error is summed at regular intervals. The Integral Error is summed to prevent the hanging problem associated with prior art systems. The Integral Error is calculated by the following equation:

$$(T_{RA}-T_{sp}) \cdot (\text{time interval since last Integral Error calculation})$$

The new Integral Error value is added to the previous Integral Error value to obtain the summed Integral Error Value.

In Step 112 the controller obtains the temperature of the air returned to the conditioned space from sensor 22. In Step 114, the new Integral Error value is calculated using the equation set forth above and the new Integral Error value is added to the previous summed Integral Error ($\Sigma IE$) as indicated in Step 116. In Step 118, a determination is made whether the summed Integral Error value is equal to or greater than a maximum summed Integral Error value for the specific operating mode. If the summed Integral Error value is not equal to or greater than the maximum Integral Error value, the system will remain in the operating mode, unless the return air temperature is equal to or is greater than a maximum designated return air temperature for the operating mode.

By summing the Integral Error hanging is eliminated. If the return air temperature remains at a high temperature for a significant period of time the summed Integral Error will soon exceed the maximum and the operating mode will be effected. For example, referring to FIG. 4, if the summed Integral Error is equal to or greater than 50, at point 401 on FIG. 4, the unit will be switched from Low Speed Cool to High Speed Cool mode 402.

In Step 120, if the return air temperature sensed is outside the set point temperature by more than a predetermined number of degrees, the unit will be switched to a new operating mode to return the conditioned space to the set point temperature. The new mode is typically one mode above or below the current mode as set forth in FIG. 4.

Except for LSHUL operating mode, during the any of the modes of operation 402, 407, 406, 412, 410, in Step 122 the controller determines if the return air temperature has changed by more than 0.1° F. in twenty second interval and if the return air temperature is within one degree ° F. of the set point temperature. If both of these conditions are met, the system mode of operation is switched to LSHUL 408. By switching the unit to LSHUL as it approaches the set point temperature the problem of overshooting the set point temperature is eliminated. Changing the operating mode serves as a decelerator for the changing conditioned space temperature.

Operation of the discrete modes will now be described.

The Steps of controller algorithm 100 are applied to control algorithm 400 to control the unit modes of operation.

If the unit is operating in LSHUL mode and in Step 120 it is determined that the temperature of the return air is at point 404 and exceeds the set point temperature by at least 1.0° F. but not more than 3.5° F., the unit is switched to Low speed Cool Economizer Bypass operating mode 406 (LSCEB). The Integral Error is then reset to zero. When the unit is switched to LSCEB the engine is on low and the economizer bypass valve 54 is energized and open. No other outputs are energized. When the system is in LSCEB mode the Integral Error is regularly calculated and the temperature of the return air is obtained by sensor 22.

If the temperature of the return air is between 3.5° F. and 8.5° F. above set point temperature or the Integral Error equal or is greater than 100, at point 403, the system switches to Low Speed Cool mode 407. When the unit is operating in Low Speed Cool Mode, the engine is set to low speed. No other outputs are energized. The Integral Error is then reset to zero.

When the unit is operating in LSC mode, if the temperature of the return air rises to a value that is more than 8.5° F. greater than the set point temperature or the Integral Error is equal to or greater than 50, in point 401, the unit is switched to High Speed Cool mode 402. When the unit is in high speed cool mode, the engine is set to high speed by energizing relay 59. The Integral Error is reset to zero.

If the unit is operating in LSHUL and the temperature of the return air as sensed by sensor 22 falls one degree below the set point temperature 415, as in point 409, the unit is switched to Low Speed Heat mode LSH, 412. The Integral Error is reset to zero. When the unit is in LSH mode the engine is set to low operating speed by energizing run relay 59, the economizer bypass valve 54 is energized and open, the pilot solenoid 57 is energized and open, the water valve 52 is energized and open, and the liquid line solenoid 82 is deenergized and closed.

If during LSH mode the return air temperature falls to a temperature that is at least 6.8° F. below the set point temperature or the Integral Error reaches a value of at least −50 at point 410, the unit is switched to High Speed Heat operating mode 414. In HSH mode, the engine is set to high operating speed by energizing the run relay, the economizer bypass valve 54 is energized, the pilot solenoid 57 is energized, the water valve 52 is energized and the liquid line solenoid 82 is deenergized and closed.

If the return air rate of change and return air temperature are within desired ranges in Step 122 the operating mode is switched to LSHUL 408 with corresponding set point 411.

FIG. 5 illustrates the algorithm 500 which graphically illustrates the operating modes of a unit used to maintain the conditioned space temperature of a frozen load. The valve settings for the modes of operation in algorithm 500 are the same as those previously described in association with algorithm 400 and therefore description of the settings will not be repeated below.

The Steps of controller algorithm 100 are applied to Frozen Load control algorithm 500 in the same manner as previously described in conjunction with Fresh Load Algorithm 400 above. The temperatures points that cause the unit to switch operating modes are different than with the fresh load application.

Upon startup, the unit is operated in High Speed Cool 502 if the return air temperature is respectively one degree Fahrenheit above or equal to the set point temperature.

When the return air temperature is between one and two degrees below the set point temperature, the unit is switched to Low Speed Heat Unloaded operating mode 504. In the Frozen Load Algorithm 500, since it is not harmful to a frozen load to be below the set point temperature, when the return air temperature is below the set point the Integral Error values are not taken into consideration when making a decision to change the system operating modes.

When the return air temperature is between one degree below the set point temperature, 507 and one degree above the set point temperature 508, the unit is switched to Low Speed Cool Economizer Bypass mode 505.

If the return air temperature exceeds one degree above the set point temperature 508, the unit is switched to Low Speed Cool 506. The Integral Error is reset to zero.

If the return air temperature is at a value that 8.5° F. or greater than the set point temperature or the Integral Error is equal to 50, at point 509, the unit is switched to High Speed Cool mode 502.

As in the fresh load algorithm 400, the rate of temperature change is continuously reviewed and if it is determined that the return air temperature has changed more than 0.1 degree in a twenty second interval and the return air temperature is equal to a value that is within one degree of the set point temperature the unit operating mode will be switched to LSHUL mode.

By the present method, better temperature control in the conditioned space if a possibility than with conventional temperature control systems that switch between heating and cooling modes. Additionally because the present system does not switch between modes, the prime mover 42 is more fuel efficient. The set point temperature is not overshot by the present system making set point temperature maintenance attainable. Thus better temperature control and fuel efficiency is obtained without adding additional valves or other flow metering and controlling devices.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. In a temperature control system for maintaining the temperature of fluid in a conditioned space at a predetermined set point temperature, the method comprising the steps of: (a) operating the temperature control system in a first operating mode; (b) sensing the temperature of the conditioned space fluid; (c) calculating the Integral Error of the temperature of the conditioned space fluid; and (d) if the Integral Error equals or exceeds a predetermined Integral Error threshold value for the first operating mode, switching the unit to a second operating mode.

2. The method as claimed in claim 1 wherein the Integral Error is calculated by first obtaining a temperature difference value by subtracting the set point temperature from the temperature of the conditioned space fluid; and then multiplying the obtained temperature difference by the time interval since the Integral Error was last calculated.

3. The method as claimed in claim 1 wherein the Integral Error is calculated by:

(1) obtaining a new Integral Error by:
   (A) calculating the difference between the set point temperature and the temperature of the fluid in the conditioned space; and
   (B) multiplying the temperature difference obtained in (A) by the time interval since the temperature difference was last calculated; and
(2) adding the new Integral Error value to the previously calculated Integral Error value.

4. The method as claimed in claim 1 wherein the method includes the additional step of switching the unit to an operating mode that prevents overshooting the set point temperature when the return air temperature is offset from the set point temperature by a predetermined minimum temperature offset and when the return air temperature rate of change exceeds a predetermined rate of change.

5. The method as claimed in claim 1 including the step of switching the unit mode of operation if the temperature of the return air exceeds a predetermined maximum return air temperature for the corresponding mode of operation.

6. The method as claimed in claim 4 wherein the temperature offset is equal to one degree and the temperature rate of change is equal to 0.1 degree per twenty seconds.

7. The method as claimed in claim 1 wherein the operating mode is Low Speed Heat Unloaded.

8. The method as claimed in claim 1 wherein the Intergral Error is calculated at regular intervals.

* * * * *